United States Patent
Kim et al.

(10) Patent No.: US 9,147,426 B2
(45) Date of Patent: Sep. 29, 2015

(54) OPTICAL PICKUP AND OPTICAL INFORMATION STORAGE SYSTEM INCLUDING THE SAME

(71) Applicant: Toshiba Samsung Storage Technology Korea Corporation, Suwon-si (KR)

(72) Inventors: Ki-bok Kim, Suwon-si (KR); Ji-sun Ahn, Seoul (KR); Ju-hee Im, Suwon-si (KR); Jin-ho Jeong, Seoul (KR); Seung-man Han, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/188,853

(22) Filed: Feb. 25, 2014

(65) Prior Publication Data

US 2014/0241142 A1 Aug. 28, 2014

(30) Foreign Application Priority Data

Feb. 25, 2013 (KR) .................. 10-2013-0020027

(51) Int. Cl.
| | | |
|---|---|---|
| G11B 7/1353 | (2012.01) | |
| G11B 7/095 | (2006.01) | |
| G11B 7/09 | (2006.01) | |
| G11B 7/1275 | (2012.01) | |
| G11B 7/00 | (2006.01) | |

(52) U.S. Cl.
CPC ............ *G11B 7/1353* (2013.01); *G11B 7/0953* (2013.01); *G11B 7/0903* (2013.01); *G11B 7/1275* (2013.01); *G11B 2007/0006* (2013.01)

(58) Field of Classification Search
CPC .......... G11B 7/08517; G11B 7/08523; G11B 7/0903; G11B 7/1353; G11B 2007/0006; G11B 7/1275; G11B 7/0953; G02B 5/18; G02B 5/1819; G02B 5/1814; G02B 5/1828

USPC ................... 369/44.37, 53.23, 53.28, 112.01, 369/112.03, 112.05, 112.06, 112.07, 369/112.15, 112.23, 53.14, 112.12

See application file for complete search history.

(56) References Cited

U.S. PATENT DOCUMENTS

| | | | | |
|---|---|---|---|---|
| 5,153,863 | A * | 10/1992 | Noda et al. .................. | 369/44.11 |
| 5,615,200 | A * | 3/1997 | Hoshino et al. .......... | 369/112.04 |
| 6,671,247 | B1 * | 12/2003 | Arai et al. ................ | 369/112.01 |
| 7,206,266 | B2 * | 4/2007 | Seong ......................... | 369/44.41 |
| 7,206,276 | B2 * | 4/2007 | Kimura et al. ............ | 369/112.08 |
| 8,625,396 | B2 * | 1/2014 | Jung ............................. | 369/44.24 |
| 2001/0043522 | A1* | 11/2001 | Park ............................ | 369/44.23 |
| 2003/0223325 | A1* | 12/2003 | Shimano et al. ........... | 369/44.26 |
| 2006/0077794 | A1* | 4/2006 | Katsuma et al. ........... | 369/44.23 |
| 2007/0230292 | A1* | 10/2007 | Yamamoto et al. ........ | 369/44.26 |

FOREIGN PATENT DOCUMENTS

| | | |
|---|---|---|
| JP | 2007-122801 | 5/2007 |
| JP | 2010-033641 | 2/2010 |
| JP | 2010-97625 | 4/2010 |
| KR | 10-2005-0097214 | 10/2005 |

* cited by examiner

*Primary Examiner* — Thomas Alunkal
(74) *Attorney, Agent, or Firm* — NSIP Law (57) ABSTRACT

Provided are an optical pickup and an optical information storage system including the same. The optical pickup includes a diffracting element that splits incident light into main light and a plurality of sub light. The diffracting element has at least three regions including first through third regions. A second region is disposed between a first region and a third region and has a phase difference from the first and third regions. The optical pickup detects a tracking error signal by using light diffracted by the diffracting element.

21 Claims, 6 Drawing Sheets

OPTICAL PICKUP AND OPTICAL INFORMATION STORAGE SYSTEM INCLUDING THE SAME

CROSS-REFERENCE TO RELATED APPLICATION(S)

This application claims the benefit under 35 USC 119(a) of Korean Patent Application No. 10-2013-0020027, filed on Feb. 25, 2013, in the Korean Intellectual Property Office, the entire disclosure of which is incorporated herein by reference for all purposes.

BACKGROUND

1. Field

The following description relates to an optical pickup capable of implementing a tracking servo that is compatible with multiple types of optical information storage media.

2. Description of Related Art

In order to implement a tracking servo, an optical pickup may split light into zeroth-order light and first-order light by transmitting the light through a grating, and may perform an operation on signals which are obtained by detecting the zeroth-order light and the first-order light.

In the case of using a grating that has a diffraction grating pattern on a single side, a spacing between zeroth-order light and first-order light is typically determined for a single disc type such as a digital versatile disc (DVD), a spacing between zeroth-order light and first-order light for a compact disc (CD) is determined according to wavelength characteristics. However, because a refractive index for a wavelength of the light for CD (i.e. infrared light) is smaller than a refractive index for a wavelength of the light for DVD (i.e. red light) a spacing between zeroth-order light and first-order light diffracted from the grating is greater in the light for CD than in the light for DVD.

As the zeroth-order light and the first-order light for DVD are closer to each other on the optical information storage medium, eccentric characteristics become easier to view. However, in a DVD dual layer (DL) disc, an increase of a parasitic curve in an S-curve may cause recognition limitation. Due to the recognition limitation, it is necessary to maintain a predetermined distance between the zeroth-order light and the first-order light. However, the predetermined spacing between the zeroth-order light and the first-order light for the DVD deteriorates eccentric disc characteristics of the CD.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided an optical pickup, including a light source unit, a diffracting element that splits light incident from the light source unit into a main light beam and a plurality of sub light beams, the diffracting element comprising at least three regions including a second region that is disposed between first and third regions and which comprises a periodic structure that has a different phase than periodic structures of the first and third regions, and a photodetector that receives the main light and the sub light reflected from the optical information storage medium, and detects a tracking error signal using zeroth-order light diffracted by the diffracting element as main light and using one of first-order light or second-order light diffracted by the diffracting element as sub light based on a type of optical information storage media being detected.

The first through third regions of the diffracting element may be arranged in a radial direction of the optical information storage medium, and the zeroth-order light, the first-order light, and the second-order light diffracted by the first through third regions may be arranged in a tangential direction of the optical information storage medium.

The linear grating patterns may be uniformly formed in the first through third regions of the diffracting element.

The light source unit may be configured to emit light of a first wavelength and light of a second wavelength for a plurality of types of the optical information storage media, respectively, having different recording density and format.

The light source unit may comprise a twin light source in which first and second light sources emitting the light of the first wavelength and the light of the second wavelength for the plurality of types of the optical information storage media are packaged into a single unit.

The plurality of types of the optical information storage media may comprise a first optical information storage medium that is recorded/reproduced by the light of the first wavelength, and a second optical information storage medium that is recorded/reproduced by the light of the second wavelength, and the light of the first wavelength is shorter in wavelength than the light of the second wavelength, the second-order light is used as the sub light when the first optical information storage medium is detected, and the first-order light is used as the sub light when the second optical information storage medium is detected.

The photodetector may comprise a first main light receiving part and a first sub light receiving part that receive the main light and the sub light, respectively, of the light of the first wavelength, and a second main light receiving part and a second sub light receiving part that receive the main light and the sub light, respectively, of the light of the second wavelength.

The spacing between the first main light receiving part and the first sub light receiving part may be twice as wide as the spacing between the second main light receiving part and the second sub light receiving part.

The optical information storage medium having the individually different type may comprise a digital versatile disc (DVD) and a compact disc (CD).

The periodic structures formed in the first and third regions may have a 180-degree phase difference from the periodic structure formed in the second region of the diffracting element.

The optical pickup may further comprise an objective lens that forms a main light spot and a plurality of sub light spots on the optical information storage medium by focusing the main light and the sub light incident thereon.

In an aspect, there is provided an optical pickup, including a light source unit that emits light of a first wavelength for a digital versatile disc (DVD) and light of a second wavelength for a compact disc (CD), a diffracting element that splits light incident from the light source unit into a main light beam and a plurality of sub light beams, the diffracting element comprising at least three regions including a second region that is disposed between first and third regions and which comprises a periodic structure that has a different phase than periodic structures of the first and third regions, and a photodetector that receives the main light and the sub light reflected from the optical information storage medium, and detects a tracking error signal using zeroth-order light diffracted by the diffracting element as main light and using one of first-order light and second-order light diffracted by the diffracting element as sub light based on whether the optical information storage medium is a DVD or a CD.

The second-order light may be used as the sub light when the DVD is detected, and the first-order light may be used as the sub light when the CD is detected.

The photodetector may comprise a first main light receiving part and a first sub light receiving part that receive the main light and the sub light, respectively, of the light of the first wavelength for the DVD, and a second main light receiving part and a second sub light receiving part that receive the main light and the sub light, respectively, of the light of the second wavelength for the CD.

The spacing between the first main light receiving part and the first sub light receiving part may be twice as wide as the spacing between the second main light receiving part and the second sub light receiving part.

The light source unit may comprise a twin light source in which first and second light sources emitting the light of the first wavelength for the DVD and the light of the second wavelength for the CD are packaged into a single unit.

In an aspect, there is provided an optical disc drive, including an optical pickup device configured to read data from and/or write data to an information storage medium, the optical pickup device comprising a diffracting element with multiple regions having a different phase, and a photodetector that receives a main light beam and a plurality of sub-light beams reflected from the information storage medium and passing through the diffracting element with multiple regions having different phase, and detects a tracking error signal using zeroth-order light as main light and further using one of first-order light and second-order light as sub-light based on a type of the information storage medium, and a control circuit configured to control the optical pickup device to detect the tracking error signal.

The first through third regions of the diffracting element may be arranged in a radial direction of the optical information storage medium, and the zeroth-order light, the first-order light, and the second-order light diffracted by the first through third regions may be arranged in a tangential direction of the optical information storage medium.

Linear grating patterns may be uniformly formed in the first through third regions of the diffracting element.

The light source unit may be configured to emit light of a first wavelength for a DVD and light of a second wavelength for a CD.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
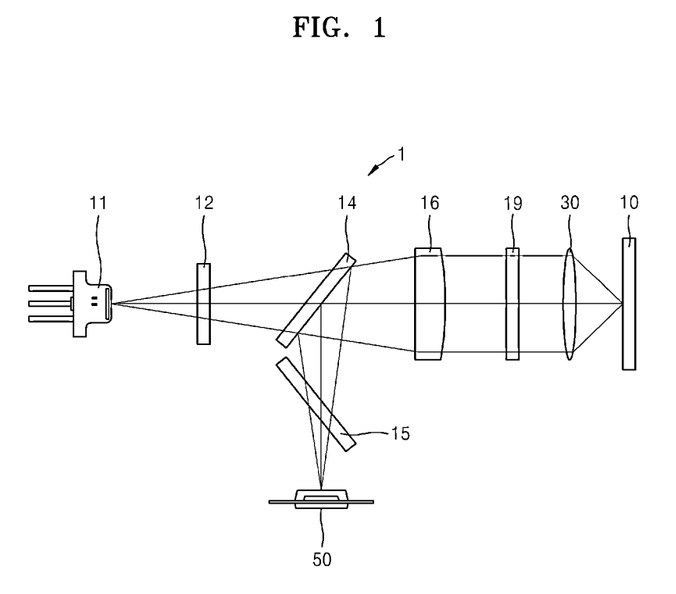
FIG. 1 is a diagram illustrating an example of an optical pickup.

FIG. 1 illustrates an example of an optical pickup.

Referring to FIG. 1, the optical pickup 1 includes a light source unit 11, a diffracting element 12, an objective lens 30, and a photodetector 50. The diffracting element 12 splits light that is received from the light source unit 11 into a main light beam and a plurality of sub light beams. The objective lens 30 may be used to form a main light spot and a plurality of sub light spots on an optical information storage medium 10 by focusing the main light and the sub light incident thereon. The photodetector 50 detects an information signal and/or an error signal by receiving the main light and the sub light reflected from the optical information storage medium 10.

In some examples, the optical pickup 1 may further include a collimating lens 16 and an optical path changer. The collimating lens 16 may cause light to be incident on the objective lens 30 by collimating light emitted from the light source unit 11. The optical path changer may be used to change a travelling path of incident light. In some examples, the optical pickup 1 may further include a detecting lens 15 that causes light reflected from the optical information storage medium 10 to be input to the photodetector 50 with appropriate light spots.

The light source unit 11 may emit light of a first wavelength and light of a second wavelength, which are suitable for a plurality of optical information storage media of different type and that have a different recording density and format. For example, the plurality of optical information storage media may include a first optical information storage medium that is recorded/reproduced by the light of the first wavelength, and a second optical information storage medium that is recorded/reproduced by the light of the second wavelength. In this example, the first optical information storage medium may have higher density than the second optical information storage medium, and the light of the first wavelength may be shorter in wavelength than the light of the second wavelength. For example, the first optical information storage medium may be a digital versatile disc (DVD) such as a DVD-R/RW or a DVD-RAM, and the second optical information storage medium may be a compact disc (CD) such as a CD-R. According to various aspects, when the first optical information storage medium such as a DVD is used, the second-order light may be used as the sub light, and when the second optical information storage medium is employed, the first-order light may be used as the sub light. Here, the sub light may be used by the photodetector to determine a track error signal.

When the optical pickup 1 is provided to be compatible with the CD and the DVD, the light source unit 11 may emit light of a red wavelength suitable for the DVD, for example, light of a wavelength of about 650 nm, as the light of the first wavelength, and may emit light of an infrared wavelength suitable for the CD, for example, light of a wavelength of about 780 nm, as the light of the second wavelength.

For example, the light source unit 11 may include a twin light source in which first and second light sources are used to emit the light of the first wavelength and the light of the second wavelength suitable for the plurality of optical information storage media. The first and second light sources may be packaged into a single unit. For example, the light source unit 11 may include a two-wavelength twin light source, that is, a twin laser diode (LD), in which first and second light sources emitting the light of the first wavelength suitable for the DVD and the light of the second wavelength suitable for the CD are packaged into a single unit.

As another example, the light source unit 11 may separately include the first light source and the second light source that emit the light of the first wavelength and the light of the second wavelength, respectively, and may further include an element that combines travelling paths of the light of the first wavelength and the light of the second wavelength. In some examples, the light source unit 11 may further include at least one additional light source that emits light of yet another wavelength.

The objective lens 30 may help form the main light spot and the sub light spots on the optical information storage medium 10 by focusing the main light and the plurality of types of sub lights emitted from the light source unit 11 and split by the diffracting element 12. The objective lens 30 may be provided such that the DVD and the CD are compatibly employed.

When the light source unit 11 emits the light of the first wavelength suitable for the DVD such as the light of the red wavelength, and the light of the second wavelength suitable for the CD such as the light of the infrared wavelength, and the objective lens 30 may have a numerical aperture capable of compatibly employing the DVD and the CD. Accordingly, the optical pickup 1 may record and/or reproduce the DVD and the CD. The DVD may include a DVD-R/DVD-RW and a DVD-RAM. The CD may include a CD-R.

The wavelength of light emitted from the light source unit 11 and the numerical aperture of the objective lens 30 may be variously modified, and the optical configuration of the optical pickup 1 according to various aspects may also be variously modified.

For example, to compatibly employ a BD and a DVD, the light source unit 11 may emit light of a blue wavelength suitable for a high-density optical disc (for example, the BD) as the light of the first wavelength, and emit light of a red wavelength suitable for the DVD as the light of the second wavelength. In this example, the objective lens 30 achieves an effective numerical aperture suitable for the BD and the DVD. In addition, the optical pickup 1 may further include a separate member that adjusts the effective numerical aperture.

In addition, the optical pickup 1 may record and/or reproduce data to and from the DVD and/or the CD through the optical configuration illustrated in FIG. 1, and may further include an additional optical configuration that records and/or reproduces data to and from the high-density optical information storage medium such as the DB.

The collimating lens 16 may collimate light emitted from the light source unit 11 and cause the light to be incident on the objective lens 30. The collimating lens 16 may be disposed between the optical path changer and the objective lens 30.

The optical path changer may direct the light incident from the light source unit 11 toward the objective lens 30, and direct the light reflected from the optical information storage medium 10 toward the photodetector 50. For example, the optical path changer may include a polarization-dependent optical path changer such as a polarizing beam splitter 14 which converts a travelling path of incident light according to polarization. In some examples, the optical pickup 1 may further include a quarter-wave plate 19 that changes the polarization of the incident light on the optical path between the polarizing beam splitter 14 and the objective lens 30. Although FIG. 1 illustrates an example in which the quarter-wave plate 19 is disposed between the collimating lens 16 and the objective lens 30, as another example the quarter-wave plate 19 may be disposed between the polarizing beam splitter 14 and the collimating lens 16.

In an example in which the polarizing beam splitter 14 and the quarter-wave plate 19 are provided, first linearly polarized light incident from the light source unit 11 to the polarizing beam splitter 14 transmitted from a mirror surface of the polarizing beam splitter 14, may be converted into first circularly polarized light while passing through the quarter-wave plate 19, and travels toward the optical information storage medium 10. The first circularly polarized light may be converted into second circularly polarized light that is orthogonal to the first circularly polarized light while being reflected from the optical information storage medium 10. Then, the second circularly polarized light may be converted into second linearly polarized light that is orthogonal to the first linearly polarized light while passing through the quarter-wave plate 19. The second linearly polarized light may be reflected from the mirror surface of the polarizing beam splitter 14 and may be directed toward the photodetector 50.

Examples of the polarization-dependent optical path changer include a polarization hologram element that transmits one polarized light that is emitted from the light source unit 11 as it is, and diffracts light into +first-order light or −first-order light with respect to another polarized light that is incident thereon after reflection from the optical information storage medium 10. In an example in which the polarization hologram element is provided as the polarization-dependent optical path changer, the light source unit 11 and the photodetector 50 may be optically modularized accordingly.

As another example, instead of the polarization-dependent optical path changer, the optical pickup 1 may include a beam splitter that transmits and reflects light that is incident thereon at a predetermined ratio, or a hologram element that transmits light emitted from the light source unit 11 as it is, and diffracts into +first-order light or −first-order light with respect to light that is incident thereon after reflection from the optical information storage medium 10. In an example in which the hologram element is provided as the optical path changer, the light source unit 11 and the photodetector 50 may be optically modularized accordingly.

The detecting lens 15 may be configured such that the light reflected from the optical information storage medium 10 and incident while passing through the objective lens 30 and the collimating lens 16 is input to the photodetector 50 with appropriate light spots. For example, the detecting lens 15 may be provided with an astigmatic lens that generates astigmatism so that a focus error signal is detected by an astigmatism method.

In the optical pickup 1, a tracking error signal may be detected by various methods, for example, a three-beam method or a differential push-pull method. The tracking error signal may be detected using zeroth-order light diffracted by the diffracting element 12 as the main light and also using first-order light or second-order light diffracted by the diffracting element 12 (that is, ±first-order light or ±second-order light) as the sub light based on a type of the optical information storage medium 10. For example, the first-order light may be used when a CD such as a CD-R is being detected as the optical information storage medium 10, and the second-order light may be used when a DVD such as a DVD-R/RW or a DVD-RAM is being detected as the optical information storage medium 10. The first-order light may include +first-order light and/or −first-order light. The second-order light may include +second-order light and/or −second-order light.

Figure 2:
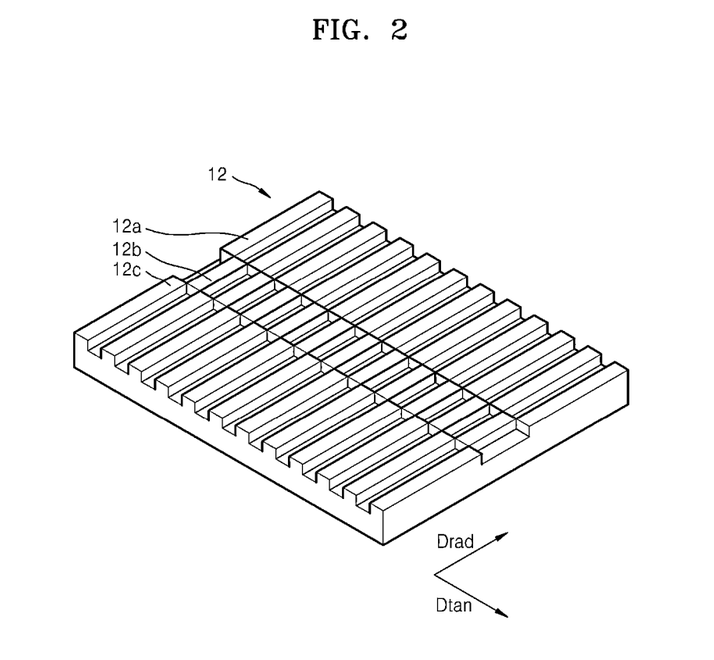
FIG. 2 is a diagram illustrating an example of a single-sided grating that is usable as a diffracting element in the optical pickup of FIG. 1.

According to various aspects, the diffracting element 12 may split light incident from the light source unit 11 into the main light beam and the plurality of sub light beams so that the tracking error signal may be detected by the three-beam method or the differential push-pull method. As illustrated in FIG. 2, the diffracting element 12 is a single-sided grating that has a plurality of regions, for example, at least three regions including first through third regions 12a, 12b and 12c with different phases from adjacent regions. The diffracting element may be configured to split incident light into zeroth-order light, ±first-order light, and ±second-order light.

Referring to FIG. 2, for example, linear grating patterns with predetermined periodic structures may be uniformly formed in the first through third regions 12a, 12b and 12c. In this example, the second region 12b is disposed between the first region 12a and the third region 12c, and the periodic structures formed in the first and third regions 12a and 12c are formed such that they have a 180-degree phase difference from the periodic structure formed in the second region 12b.

Figure 3:
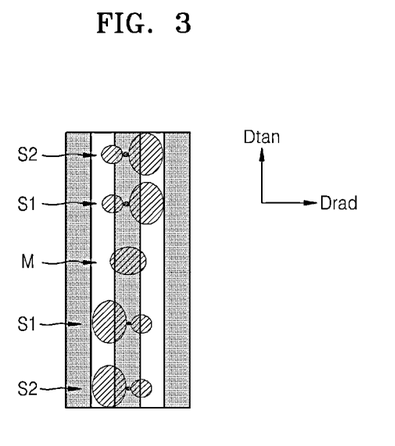
FIG. 3 is a diagram illustrating an example in which light spots of zeroth-order light, ±first-order light, and ±second-order light diffracted by the diffracting element of FIG. 2 are formed on an optical information storage medium.

For example, the first through third regions 12a, 12b and 12c may be arranged in a radial direction (Drad) of the optical information storage medium 10. As illustrated in FIG. 3, the zeroth-order light, the first-order light, and the second-order light which are diffracted by the first through third regions 12a, 12b and 12c may be arranged in a tangential direction (D tan) of the optical information storage medium 10.

FIG. 3 illustrates an example in which the zeroth-order light, the ±first-order light, and the ±second-order light diffracted by the diffracting element of FIG. 2 are formed on the optical information storage medium 10. According to various aspects, zeroth-order light is the main light and is formed on the optical information storage medium 10 as the main light spot M. The ±first-order light is a sub light and is formed on the optical information storage medium 10 as the sub light spots S1. The ±second-order light is also a sub light and is formed on the optical information storage medium 10 as the sub light spots S2.

In FIG. 3, the light spots formed along the center of the track are the main light spot M of the zeroth-order light, the sub light spots S1 of the ±first-order light, and the sub light spots S2 of the ±second-order light, which are each diffracted by the second region 12b. The main light spot M of the zeroth-order light, the sub light spots S1 of the ±first-order light, and the sub light spots S2 of the ±second-order light, which are diffracted by one of the first region 12a and the third region 12c, are formed along one side of the track. In addition, the main light spot M of the zeroth-order light, the sub light spots S1 of the ±first-order light, and the sub light spots S2 of the ±second-order light, which are diffracted by the other of the first region 12a and the third region 12c, are formed along the other side of the track.

In this example, the zeroth-order light, the ±first-order light, and the ±second-order light, which are diffracted by the first through third regions 12a, 12b and 12c, are arranged in a track direction, that is, a tangential direction D tan of the optical information storage medium 10. In other words, the diffracting element 12 may be configured such that light which is diffracted by the first through third regions 12a, 12b and 12c is arranged inline in parallel to a track of the optical information storage medium 10. Accordingly, the tracking error signal may be detected by using in an inline type differential push-pull (DPP) method.

As another example, the photodetector 50 may receive the light of the first wavelength and the light of the second wavelength, obtain a reproduction signal from a detection signal of the main light that is reflected from the optical information storage medium 10, and obtain a tracking error signal through the three-beam method or the differential push-pull method by operations of the detection signals of the main light and the sub light reflected from the optical information storage medium 10.

Figure 4:
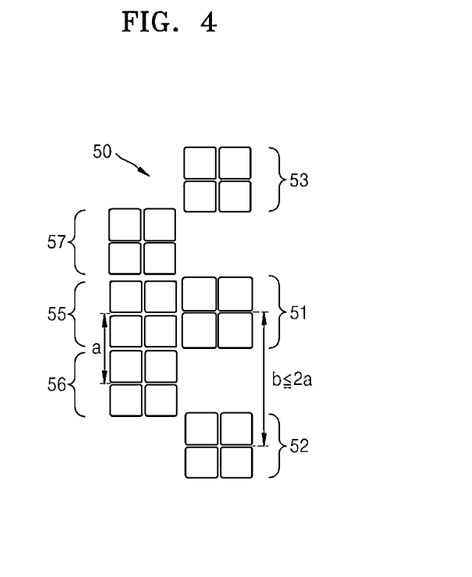
FIG. 4 is a diagram illustrating an example of a photodetector that is usable in the optical pickup of FIG. 1.

FIG. 4 illustrates an example of the photodetector 50 that may be included in the optical pickup 1.

Referring to FIG. 4, the photodetector 50 includes a first main light receiving part 51 and first sub light receiving parts 52 and 53 that receive the main light and the sub light, respectively, with respect to the light of the first wavelength. The photodetector 50 also includes a second main light receiving part 55 and second sub light receiving parts 56 and 57 that receive the main light and the sub light, respectively, with respect to the light of the second wavelength. In order to enable the detection of push-pull signals, the first sub light receiving parts 52 and 53 and the second sub light receiving parts 56 and 57 may have a four-segmented structure as illustrated in FIG. 4. As another example, the sub light receiving parts may have a two-segmented structure. In order to enable the detection of focus error signals or the like by the astigmatism method, the first main light receiving part 51 and the second main light receiving part 55 may also have a four-segmented structure.

For example, when the DVD and the CD are compatibly employed, the tracking error signal for the DVD may be detected using the zeroth-order light and the ±second-order light, and the tracking error signal for the CD may be detected using the zeroth-order light and the ±first-order light. Therefore, as illustrated in FIG. 4, the spacing 'b' between the first main light receiving part 51 and the first sub light receiving parts 52 and 53, which detect the light of the first wavelength for the DVD, may be twice as wide as the spacing 'a' between the second main light receiving part 55 and the second sub light receiving parts 56 and 57, which detect the light of the second wavelength for the CD, that is, b≤2a.

As another example, when responding to the eccentric disc of the CD, there is a difference in a degree of influence according to the spacing between the main light spot and the sub light spot in the optical information storage medium 10.

As the spacing between the main light spot and the sub light spot is decreased, the eccentric disc response ability is improved. That is, in the case of using the sub light spot of the ±first-order light in which the spacing between the main light spot and the sub light spot is closer, the eccentric disc response ability is improved.

According to various aspects, the zeroth-order light and the second-order light may be used to detect the tracking error signal with respect to the DVD such as the DVD-R/RW and the DVD-RAM, and the zeroth-order light and the first-order light may be used to detect the tracking error signal with respect to the CD such as the CD-R. Accordingly, in the DVD DL disc, a recognition limitation caused by the increase of the parasitic curve in the S-curve may be improved, and good response ability may be obtained even though the eccentric disc of the CD is used.

Figure 5:
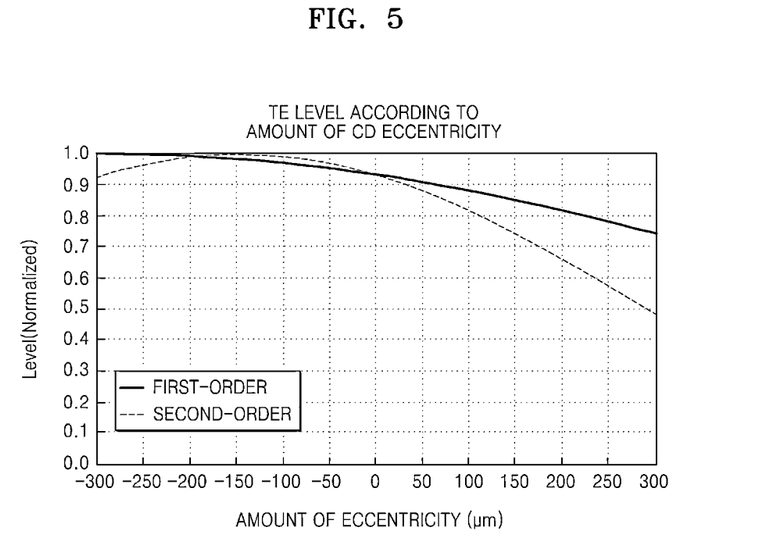
FIG. 5 is a graph illustrating an example of a level variation in a tracking error signal according to an amount of CD eccentricity when first-order light and second-order light are used.

FIG. 5 illustrates an example of the level of variation in the tracking error signal according to an amount of CD eccentricity. In this example, the level variation in the tracking error signal is not great in the case of using the first-order light, in spite of the CD eccentricity. That is, in the case of using the first-order light, the tracking servo may be implemented with respect to the CD eccentric disc having a considerable amount of eccentricity. In the case of using the second-order light, the level variation in the tracking error signal according to the amount of the CD eccentricity is relatively great. Accordingly, the use of the second-order light with respect to the CD may be inappropriate.

The simulation result of FIG. 5 illustrates the level of variation when the phase of the diffracting element is distorted by about 30 degrees in the eccentric disc. It can be seen from the simulation result of FIG. 5 that the case of using the ±first-order light, in which the spacing between the main light spot and the sub light spot is closer, may ensure correct tracking servo implementation.

Figure 6:
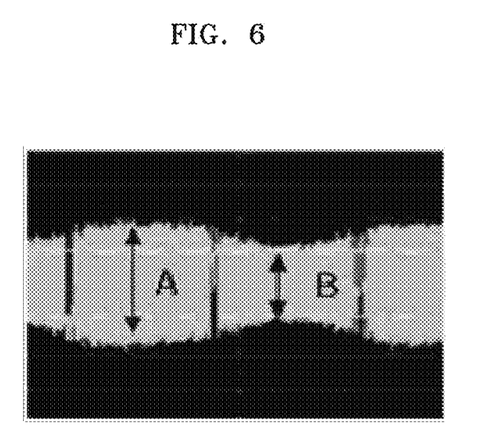
FIG. 6 is a diagram illustrating an example of a differential push-pull signal (Dpp) modulation.

FIG. 6 illustrates an example of a differential push-pull signal (Dpp) modulation. The Dpp modulation may be expressed as B/A*100, where A is a maximum width of the modulation, and B is a minimum width of the modulation. As one example, when a distance between the sub light spot S1 of the ±first-order light and the main light spot M is about 11 μm, the Dpp modulation is about 74%. As another example, when a distance between the sub light spot S2 of the ±second-order light and the main light spot M is about 22 μm, the Dpp modulation is about 52%. As the difference between A and B is smaller, that is, as the Dpp modulation is closer to 100%, the eccentricity response ability becomes better. Therefore, it can be seen from the Dpp modulation result that the eccentric disc response ability is better in the case of using the ±first-order light than in the case of using the ±second-order light with respect to the CD.

Figure 7:
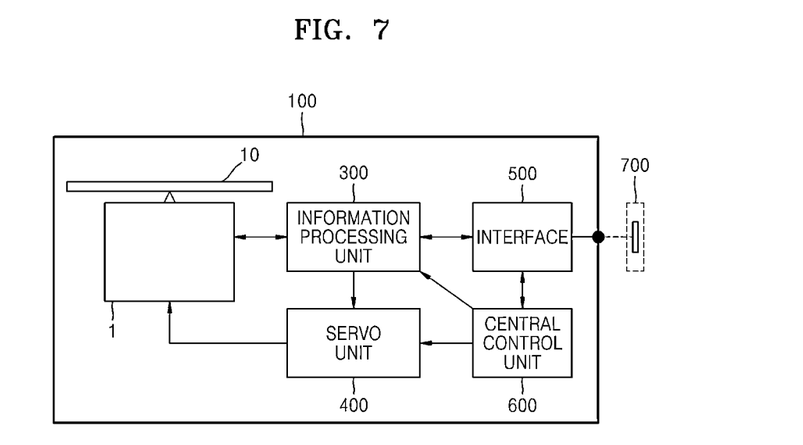
FIG. 7 is a diagram illustrating an example of an optical information storage system.

FIG. 7 illustrates an example of an optical information storage system employing the optical pickup 1.

Referring to FIG. 7, the optical information storage system 100 includes the optical pickup 1 and a control unit 600. The optical pickup 1 may be arranged movably in a radial direction of the optical information storage medium 10, and may reproduce information recorded on the optical information storage medium 10 and record information to the optical information storage medium 10. The control unit 600 controls the optical pickup 1.

The optical pickup 1 includes an optical system that has various configurations as described above, and a mechanical system mechanically supports the optical system and performs focusing and tracking operations. The optical system includes an encoder/decoder and is connected to an information processing unit 300 connected to an interface 500 for connection to an external host, and the mechanism system is connected to a servo unit 400. The information processing unit 300, the servo unit 400, and the interface 500 are controlled by the control unit 600, that is, a central control unit. The interface 500 complies with various standards. For example, the interface 500 includes a USB port. Therefore, the interface 500 is connected to a host, for example, a computer 700 by a USB protocol, and exchanges information with the computer 700.

According to various aspects, a diffracting element used in an optical pickup device may be a single-sided grating that has a plurality of regions, for example, at least three regions including first through third regions. The regions may be disposed such that a region with a first phase may be disposed between adjacent regions with a second phase which is different from the first phase. Accordingly, the diffracting element may split incident light into zeroth-order light, first-order light, and second-order light and a photodetector may obtain a tracking error signal from the zeroth order light and one of the first order light and the second order light.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical pickup, comprising:
   a light source unit;
   a diffracting element configured to split light incident from the light source unit into a main light beam and sub light beams, the diffracting element comprising three regions including a second region disposed between first and third regions and which comprises a periodic structure having a different phase than periodic structures of the first and third regions; and
   a photodetector configured to receive the main light and the sub light reflected from an optical information storage medium, and configured to detect a tracking error signal using zeroth-order light diffracted by the diffracting element as main light and using one of first-order light or second-order light diffracted by the diffracting element as sub light based on a type of the optical information storage medium being detected, wherein
   the photodetector is configured to
      detect an eccentric disc response ability indicative of a level of variation in the tracking error signal and based on a spacing between a first main light receiving part and a first sub light receiving part and/or the spacing between a second main light receiving part and a second sub light receiving part, and
      to use the first-order light as sub light in response to a CD being detected, and use the second-order light as sub light in response to a DVD-RW or a DVD-RAM being detected.

2. The optical pickup of claim 1, wherein the first through third regions of the diffracting element are arranged in a radial direction of the optical information storage medium, and the zeroth-order light, the first-order light, and the second-order light diffracted by the first through third regions are arranged in a tangential direction of the optical information storage medium.

3. The optical pickup of claim 1, wherein linear grating patterns are uniformly formed in the first through third regions of the diffracting element.

4. The optical pickup of claim 1, wherein the light source unit is configured to emit light of a first wavelength and light of a second wavelength for types of the optical information storage media, respectively, having different recording density and format.

5. The optical pickup of claim 4, wherein the light source unit comprises a twin light source in which first and second light sources emitting the light of the first wavelength and the light of the second wavelength for the types of the optical information storage media are packaged into a single unit.

6. The optical pickup of claim 4, wherein the types of the optical information storage media comprise:
a first optical information storage medium that is recorded/reproduced by the light of the first wavelength; and
a second optical information storage medium that is recorded/reproduced by the light of the second wavelength, and
the light of the first wavelength is shorter in wavelength than the light of the second wavelength,
the second-order light is used as the sub light in response to the first optical information storage medium being detected, and
the first-order light is used as the sub light in response to the second optical information storage medium being detected.

7. The optical pickup of claim 6, wherein the photodetector comprises:
a first main light receiving part and a first sub light receiving part configured to receive the main light and the sub light, respectively, of the light of the first wavelength; and
a second main light receiving part and a second sub light receiving part configured to receive the main light and the sub light, respectively, of the light of the second wavelength.

8. The optical pickup of claim 7, wherein the spacing between the first main light receiving part and the first sub light receiving part is twice as wide as the spacing between the second main light receiving part and the second sub light receiving part.

9. The optical pickup of claim 1, wherein the periodic structures formed in the first and third regions have a 180-degree phase difference from the periodic structure formed in the second region of the diffracting element.

10. The optical pickup of claim 1, further comprising an objective lens that forms a main light spot and sub light spots on the optical information storage medium by focusing the main light and the sub light incident thereon.

11. An optical pickup, comprising:
a light source unit configured to emit light of a first wavelength for a digital versatile disc (DVD) and light of a second wavelength for a compact disc (CD);
a diffracting element configured to split light incident from the light source unit into a main light beam and sub light beams, the diffracting element comprising three regions including a second region disposed between first and third regions and which comprises a periodic structure having a different phase than periodic structures of the first and third regions; and
a photodetector configured to receive the main light and the sub light reflected from optical information storage medium, and configured to detect a tracking error signal using zeroth-order light diffracted by the diffracting element as main light and using one of first-order light and second-order light diffracted by the diffracting element as sub light based on whether the optical information storage medium is a DVD or a CD, wherein
the photodetector is configured
to detect an eccentric disc response ability indicative of a level of variation in the tracking error signal and based on a spacing between a first main light receiving part and a first sub light receiving part and/or the spacing between a second main light receiving part and a second sub light receiving part, and
to use the first-order light as sub light in response to the CD being detected, and use the second-order light as sub light in response to the DVD-RW or the DVD-RAM being detected.

12. The optical pickup of claim 11, wherein the photodetector comprises:
a first main light receiving part and a first sub light receiving part configured to receive the main light and the sub light, respectively, of the light of the first wavelength for the DVD; and
a second main light receiving part and a second sub light receiving part configured to receive the main light and the sub light, respectively, of the light of the second wavelength for the CD.

13. The optical pickup of claim 12, wherein the spacing between the first main light receiving part and the first sub light receiving part is twice as wide as the spacing between the second main light receiving part and the second sub light receiving part.

14. The optical pickup of claim 11, wherein the light source unit comprises a twin light source in which first and second light sources emitting the light of the first wavelength that records and reproduces information from the DVD and the light of the second wavelength that records and reproduces information from the CD are packaged into a single unit.

15. An optical disc drive, comprising:
an optical pickup device configured to read data from and/or write data to an information storage medium, the optical pickup device comprising:
a diffracting element with regions, each of the regions having a different phase, and
a photodetector configured to receive a main light beam and sub-light beams reflected from the information storage medium and passing through the diffracting element with the regions having different phases, and configured to detect a tracking error signal using zeroth-order light as main light and further using one of first-order light and second-order light as sub-light based on a type of the information storage medium, wherein
the photodetector is
configured to detect an eccentric disc response ability indicative of a level of variation in the tracking error signal and based on a spacing between a first main light receiving part and a first sub light receiving part and/or the spacing between a second main light receiving part and a second sub light receiving part, and configured to use the first-order light as sub light in response to a CD being detected, and use the second-order light as sub light in response to a DVD-RW or a DVD-RAM being detected; and a control circuit configured to control the optical pickup device to detect the tracking error signal.

16. The optical disc drive of claim 15, wherein the first through third regions of the diffracting element are arranged in a radial direction of the optical information storage medium, and the zeroth-order light, the first-order light, and the second-order light diffracted by the first through third regions are arranged in a tangential direction of the optical information storage medium.

17. The optical disc drive of claim 15, wherein the first through third regions of the diffracting element comprise linear grating patterns uniformly formed.

18. The optical disc drive of claim 15, wherein the light source unit is configured to emit light of a first wavelength that records and reproduces information from a DVD and light of a second wavelength that records and reproduces information from a CD.

19. The optical pickup of claim 1, wherein the photodetector is configured to measure a differential push-pull signal (Dpp) modulation indicative of a ratio between a minimum width of a modulation and a maximum width of a modulation based on a spacing between the first main light receiving part and the first sub light receiving part and/or the spacing between the second main light receiving part and the second sub light receiving part.

20. The optical pickup of claim 1, wherein the photodetector is configured to use the second-order light as sub light in response to the DVD-RW being detected, and use the second-order light as sub light in response to the DVD-RAM being detected.

21. The optical pickup of claim 1, wherein the light incident from the light source unit is converted into a first circularly polarized light while passing through a quarter-wave plate, the first circularly polarized light is converted into a second circularly polarized light orthogonal to the first circularly polarized light while reflected from the optical information storage medium, and the second circularly polarized light is converted into a second linearly polarized light orthogonal to the first linearly polarized light while passing through the quarter-wave plate.

* * * * *